United States Patent [19]

Arsenault et al.

[11] Patent Number: 5,359,483

[45] Date of Patent: Oct. 25, 1994

[54] LIFTER HAVING AN ANGLED TRAILING EDGE AND CUT-OUT REGION FOR CLEANING A FLEXIBLE MAGNETIC RECORDING DISC

[75] Inventors: Cathleen M. Arsenault; Eric J. Donaldson, both of St. Paul; John W. Swanson, Maplewood, all of Minn.

[73] Assignee: Minnesota Mining and Manufacturing Company, St. Paul, Minn.

[21] Appl. No.: 962,470

[22] Filed: Oct. 16, 1992

[51] Int. Cl.$^5$ .................................................. G11B 23/03
[52] U.S. Cl. .................................................. 360/133
[58] Field of Search ................. 360/133, 130.34, 135, 360/137; 369/291

[56] References Cited

U.S. PATENT DOCUMENTS

| | | | |
|---|---|---|---|
| 4,510,546 | 4/1985 | Asami et al. | 360/133 |
| 4,620,247 | 10/1986 | Papciak et al. | 360/97 |
| 4,654,742 | 3/1987 | Harris et al. | 360/133 |
| 4,672,499 | 6/1987 | Oishi et al. | 360/133 |
| 4,677,516 | 6/1987 | Iizuka et al. | 360/133 |
| 4,677,517 | 6/1987 | Gelardi et al. | 360/133 |
| 4,739,433 | 4/1988 | Oishi | 360/133 |
| 4,750,075 | 6/1988 | Oishi | 360/133 |
| 4,809,114 | 2/1989 | Seto | 360/133 |
| 4,979,065 | 12/1990 | Ikebe et al. | 360/133 |
| 5,083,231 | 1/1992 | Veenstra et al. | 360/133 |
| 5,090,010 | 2/1992 | Takahashi | 360/133 |

OTHER PUBLICATIONS

Diagrams dated Dec. 12, 1991 showing Fuji and TDK lifter designs (2 pages).

*Primary Examiner*—Stuart S. Levy
*Assistant Examiner*—Kevin M. Watkins
*Attorney, Agent, or Firm*—Gary L. Griswold; Walter N. Kirn; Eric D. Levinson

[57] ABSTRACT

A lifter for cleaning a flexible magnetic recording disc. The lifter forces a fabric liner on the inner surface of a cartridge toward the rotating disc. The perimeter of the lifter is configured so that the force profile of the lifter taken across the width of its leading edge is not characterized by sudden changes in force across its width. The lifter can include a cut-out region within the area of the lifter, the region being configured to increase the force applied by the lifter along the inner tracks of the magnetic recording disc. The lifter does not significantly increase the torque required to drive the disc. The invention also includes a method of cleaning a disc using the lifter described above.

16 Claims, 2 Drawing Sheets

LIFTER HAVING AN ANGLED TRAILING EDGE AND CUT-OUT REGION FOR CLEANING A FLEXIBLE MAGNETIC RECORDING DISC

FIELD OF THE INVENTION

The present invention relates generally to flexible magnetic recording disc cartridges, and more specifically to a lifter for lifting a fabric liner in such cartridges to contact and thereby clean a disc in the cartridge.

BACKGROUND OF THE INVENTION

Floppy magnetic recording discs are flexible discs of polyester resin or the like having a magnetic layer on each side thereof on which information is recorded by a magnetic head. Floppy discs which have a diameter of 3½ inches (8.9 cm) or less are known as micro-floppy discs. Generally, the micro-floppy disc is accommodated in a hard casing to form a cartridge. The micro-floppy disc comprises a circular magnetic recording medium which is thin, has a small diameter, and has a hub fixed to the center of the recording medium.

The cartridge generally includes a fabric liner on both inner surfaces of the casing. The liner is kept in contact with the recording surface of the disc to remove debris on the recording surface while the disc is rotated. The liner has a width at least equal to the width of the recording region of the disc, and is kept pressed against the entire width of the recording surface by a lifter which is secured to the inner surface of the casing.

As explained in U.S. Pat. No. 4,739,433 (Oishi), it is desirable to have the lifter exert more pressure on the inner data tracks of the disc than on the outer data tracks. This is so because the recording density of the disc is greater at its inner tracks, which results from the fact that the same amount of information is recorded during one rotation of the disc regardless of which data track is being recorded on. Thus, debris which might not cause a problem on an outer data track can cause loss of data ("drop-outs") in the reading of data on the inner tracks. It is, therefore, desirable to clean the inner tracks more thoroughly than the outer tracks.

SUMMARY OF THE INVENTION

Accordingly, the present invention includes an improved lifter for supporting a fabric liner of a flexible magnetic recording disc cartridge against a flexible recording disc so that the disc is cleaned by the rotation of the disc with respect to the liner. The lifter includes a head connected by an arm to a foot, which is secured to an inner surface of the cartridge. The head has a front end, a rear end, and two opposite, parallel sides which are separated by a distance sufficient to span the distance between the innermost and outermost data tracks on a magnetic recording disc. The head is bounded on its front end by a straight leading edge which is substantially perpendicular to the two parallel sides of the head. The head is bounded on its rear end by the arm and the trailing edge, a portion of which is located between the arm and the side of the head closer to the outermost data track. The aforementioned portion of the trailing edge is oriented at an angle of at least 5°, and more preferably about 10° to 25°, with respect to the leading edge, so that the trailing edge approaches the leading edge as the trailing edge approaches the side of the head closer to the outermost data track. A force profile taken across the width of the lifter is smooth and is not characterized by sudden changes in force.

In one embodiment of the present invention, the lifter described above includes a pattern formed by removing portions of the material making up the lifter from the internal area of the lifter. The pattern is configured to allow an increase in the force along the inner tracks of the disc relative to the outer tracks without raising the overall torque required by a disc drive to drive the disc by more than 5% for a given angle of tilt of the lifter from the inner surface of the cartridge. The pattern can include parallel, elongated slots in the head of the lifter.

The present invention also includes a method of cleaning a flexible magnetic recording disc. The method includes forcing a fabric liner against a disc with the lifter described above, and rotating the disc with respect to the cartridge and fabric liner.

In another embodiment of the present invention, a lifter includes a head and a foot. The head includes a pattern formed by at least one cut-out region.

BRIEF DESCRIPTION OF THE DRAWINGS

The present invention will be further understood with reference to the accompanying drawing wherein.

DETAILED DESCRIPTION

Figure 1:
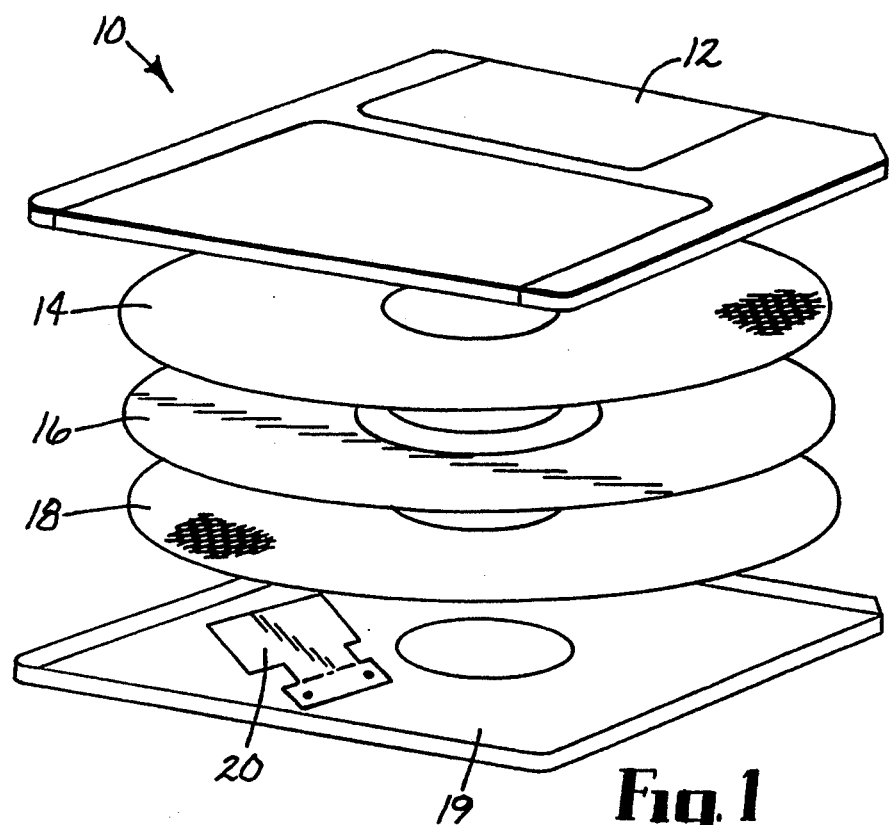
FIG. 1 is a perspective, exploded view of a prior art micro-floppy magnetic recording disc cartridge.

A prior art micro-floppy magnetic recording disc cartridge 10 is shown in FIG. 1. The cartridge 10 is comprised of two outer casings 12 and 19 which enclose a floppy magnetic recording disc 16. The casings 12 and 19 each have a fabric liner 14 and 18, respectively, on their inner surface which approximates the shape of the disc 16. A prior art lifter 20 is affixed to the inner surface of the casing 19 and applies an upward pressure on the fabric liner 18 which causes the fabric to rub against the disc 16, thereby cleaning the disc when it is rotated in the cartridge 10.

Figure 2:
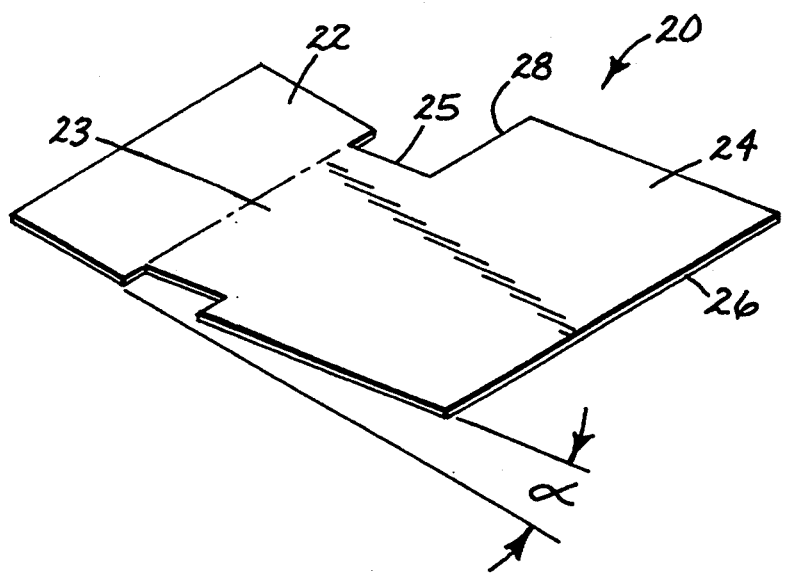
FIG. 2 is a perspective view of the prior art lifter of FIG. 1.

A close-up view of the prior art lifter 20 is shown in FIG. 2. The lifter 20 is comprised of a foot 22, an arm 23, and a head 24. The arm 23 is biased at an angle $\alpha$ of about 6° to 8° with respect to the casing 19 so that the head 24 forces the fabric liner 18 up against the micro-floppy disc 16. The head 24 has a leading edge 26 which supports the fabric liner 18 against the disc 16. The head 24 also has a trailing edge 28 which is opposite the leading edge 26. The leading edge 26 and the trailing edge 28 are parallel to each other. The arm 23 has a side 25 that is perpendicular to the trailing edge 28.

Figure 3:
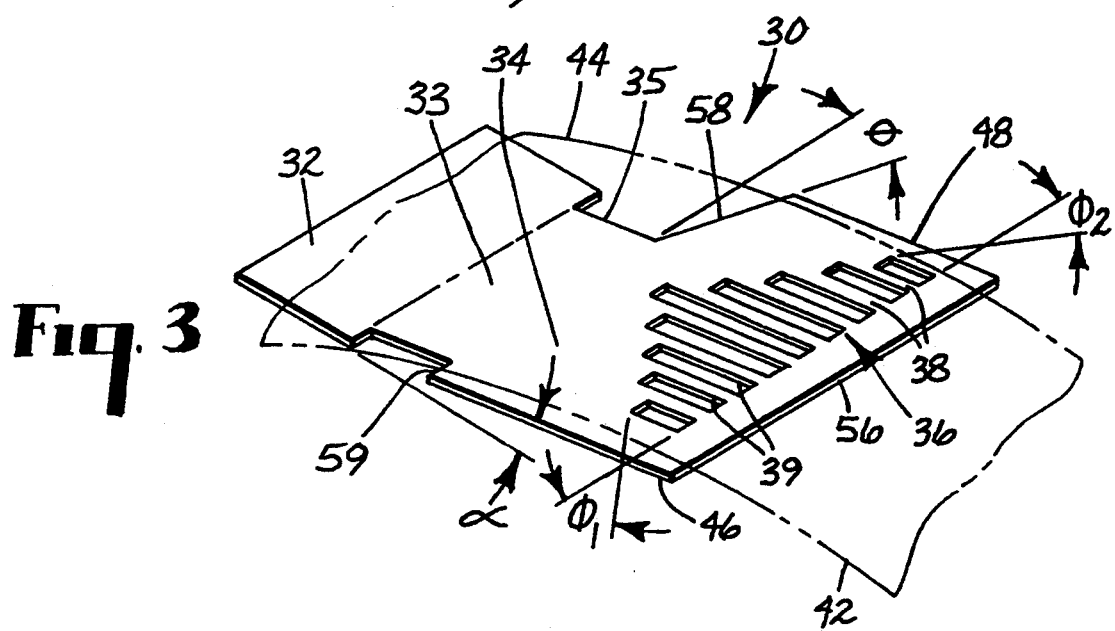
FIG. 3 is a perspective view of one embodiment of a lifter according to the present invention.

A lifter 30 according to the present invention is shown in FIG. 3. The lifter 30 is comprised of a foot 32 secured to the inner surface of a cartridge (not shown), a head 34, and an arm 33 connecting the head to the foot. The foot 32 can be attached to the inside of a cartridge by either use of an adhesive, fusion bonding, ultrasonic welding, peening, or by other methods known to those skilled in the art. The arm 33 is biased at an angle $\alpha$ of about 6° to 8° with respect to a cartridge casing (not shown) so that the head 34 forces a fabric liner (not shown) up against a micro-floppy disc (not shown).

The head 34 has a front end, a rear end, and two opposite parallel sides 46 and 48. The front end of the head 34 is bounded by a straight, leading edge 56, which is substantially perpendicular to the two parallel sides 46 and 48. The head 34 is bounded on its rear end by trailing edges 58 and 59, which are separated by the arm 33. The trailing edge 58 extends from the arm 33 to the side 48, which is closer than the opposite, parallel side 46 to the outermost data track 44 on a microfloppy disc. The head 34 has a width which is sufficient to span the distance between an innermost data track 42 and an outermost data track 44 on a micro-floppy disc.

Unlike the prior art lifter 20, the trailing edge 58 of the head 34 is not parallel to the leading edge 56, but rather is oriented at an angle $\theta$ with respect to the leading edge 56, so that the trailing edge approaches the leading edge as the trailing edge approaches the side 48. Thus the trailing edge 58 is not perpendicular to a side 35 of the arm 33. The angle $\theta$ is preferably greater than 5° and less than 40°, more preferably greater than 10° and less than 25°, and most preferably about 16°.

In one embodiment of the lifter 30 of the present invention, the lifter can include a pattern 36 cut into the central portion of the head 34. The pattern 36 is preferably located so that the pattern is centered between the inner and outer data tracks 42 and 44. The shape of the pattern 36 preferably resembles a triangle having its base parallel to the leading edge 56. The two legs of the triangle are oriented at angles of $\phi_1$ and $\phi_2$ with respect to the leading edge 56. The angle $\phi_1$ preferably falls within the range of from about 10° to 60°, more preferably about 20° to 45°, and most preferably about 33°. The angle $\phi_2$ preferably falls within the range of from about 10° to 70°, more preferably about 25° to 50°, and most preferably about 39°.

The pattern 36 is formed by removing material from the head 34 of the lifter 30 to create at least one cut-out region. The pattern 36 is preferably comprised of a plurality of cut-out regions. These cut-out regions can be parallel, elongated slots 39 which are separated by a plurality of parallel, elongated land-bridge strips 38 which result from cutting the slots in the head 34. The elongated slots 39 preferably have a width of about 1.2 mm and the land-bridge strips 38 preferably have a width of about 0.6 min. The strips 38 and the slots 39 are preferably oriented so that their lengths are perpendicular to the leading edge 56.

Figure 4:
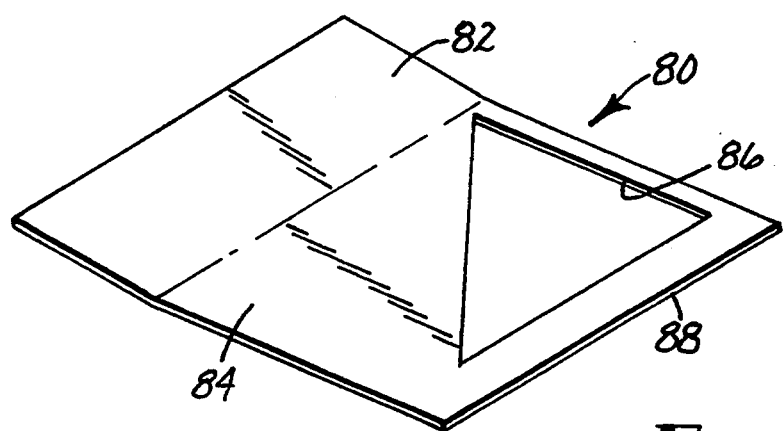
FIG. 4 is a perspective view of another embodiment of a lifter according to the present invention.

Another embodiment of the present invention is shown as lifter 80 in FIG. 4. The lifter 80 is comprised of a foot 82, which is secured to the inner surface of a cartridge (not shown), and a head 84. As shown in FIG. 4, the lifter 80 has no arm connecting the foot 82 to the head 84. However, an arm may be included if desired. Like the lifter 30, the lifter 80 has a width which is sufficient to span the distance between the outer and inner data tracks on a micro-floppy disc (not shown). And like the lifter 30, the end edge 88 which supports a fabric liner (not shown) against the disc is parallel to the width of the head 84.

The lifter 80 includes a pattern 86 cut into the central portion of the head 84. The pattern 86 can be a single cut-out, as shown in FIG. 4, or it can include a plurality of cut-out slots, thereby creating a plurality of land bridge strips, as shown in the pattern 36 of FIG. 3. While the shape of the pattern 86 in FIG. 4 is shown as being triangular, it may be any shape, so long as the pattern is configured to allow an increase in the force applied by the lifter against a disc along the inner tracks of the disc relative to the outer tracks without raising the overall torque required to drive the disc by more than 5% for a given angle of tilt of the head 84 to the inner surface of the cartridge (not shown).

The lifters 30 and 80 can be made of metal or plastic. Preferred metals include stainless steel and aluminum. Preferred plastics include polyesters, such as polyethylene terepthalate. The lifters 30 and 80 can be made by stamping the lifters out of a sheet of such material.

It is desirable to have a lifter which exerts a greater upward force on the inner data tracks than on the outer data tracks. Preferably, this force increases smoothly and gradually from the outer to inner data tracks. A graph 60 based on computer-generated data showing the force in dynes as a function of distance from the center of the disc in centimeters is shown in FIG. 5.

Figure 5:
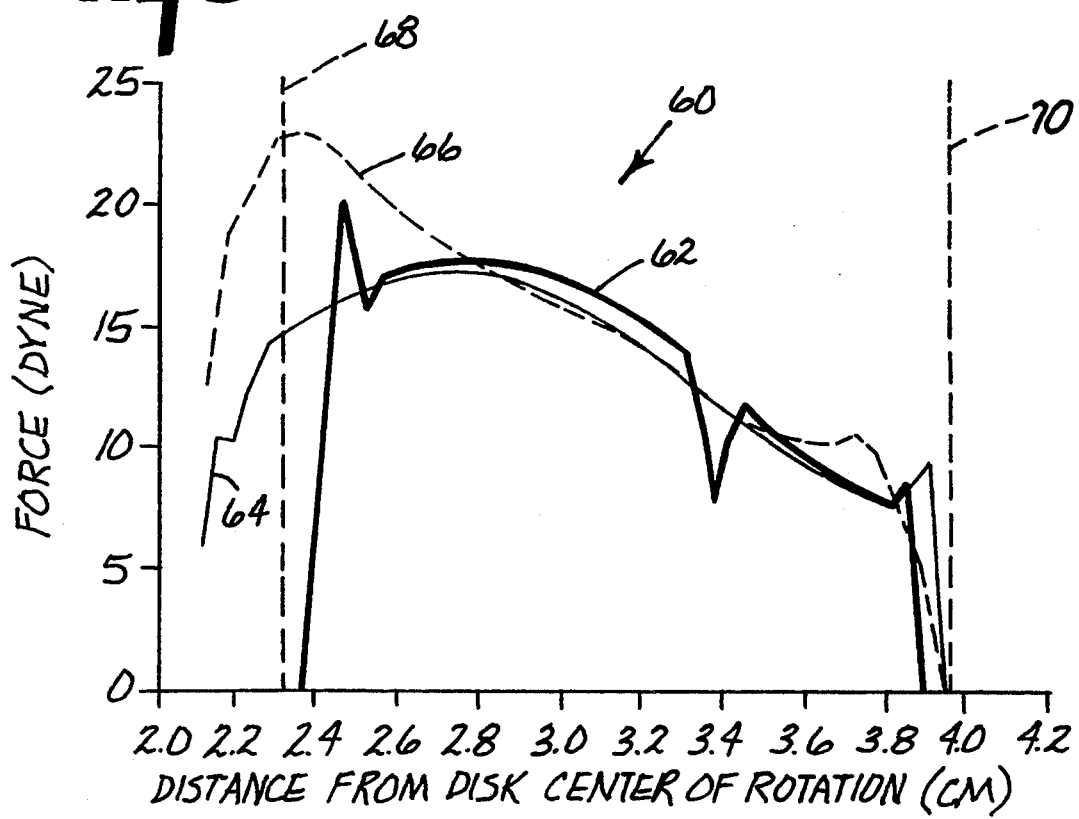
FIG. 5 is a computer-generated graph showing the improved force profile of the lifter of the present invention.

In FIG. 5, the force profile of the prior art lifter 20 is shown as line 62, the force profile of the lifter 30 having no pattern 36 is shown as line 64, and the force profile of the lifter 30 having the pattern 36 shown in FIG. 3 is shown as line 66. All three lifters were biased at the same angle $\alpha$ of about 6° to 8°. The approximate locations of the inner and outer data tracks are represented by dotted lines 68 and 70, at distances of 2.3 cm and 3.95 cm from the center of the disc respectively.

The force profile of the prior art lifter 20 increases from the innermost data track 68 (at 2.3 cm) to about 2.8 cm. This increase is undesirable because the force should decrease continuously from the inner track 68 to the outer track 70. At a distance of about 3.3 cm from the center of the disc, the force begins to drop rapidly until it reaches a trough at 3.4 cm, at which point it rapidly rises until a distance of 3.5 cm, at which point the force resumes its gradual decline.

The force profile of the lifter 30 lacking the cut-out pattern 36 denoted by the line 64 approximately follows the force profile of the prior art lifter 20 denoted by the line 62. However, unlike the force profile for the lifter 20, the force profile of the lifter 30 does not dip at about 3.4 cm from the center of the disc. Instead, the force profile decreases smoothly from about 2.8 cm to about 3.8 cm, which is desired.

It is believed that the sudden dip in the force profile of the prior art lifter 20 is caused by the fact that the trailing edge 28 is perpendicular to the side 25 of the arm 23. The lifter 30 of the present invention (lacking the pattern 36) does not have that sudden dip in its force profile because the trailing edge 58 is not perpendicular to the side 35 of the arm 33, i.e., it is not parallel to the leading edge 56. Without intending to be bound by any one particular theory, it is believed that this non-perpendicular angle between the trailing edge 58 and the side 35 of the arm 33 affects the flex characteristics of the lifter 30 in such a way that the sudden dip in the force profile of the prior art lifter 20 is eliminated by orienting the trailing edge 58 at an angle of at least 5°, preferably 10° to 25°, and most preferably about 16° with respect to the leading edge 56.

The force profile of the embodiment of the lifter 30 which includes the pattern 36 having slots 39 with a width of about 1.2 mm and land-bridge strips 38 having a width of about 0.6 mm is shown as line 66 in FIG. 5. This force profile is preferable to the profile of the prior art lifter 20 for two reasons. First, it lacks the rapid fall and rise of the force profile of the lifter 20 that occurs at about 3.4 cm. Second, the force exerted by the lifter 30 with the pattern 36 is significantly higher on the inner tracks than the force exerted by the other two lifters, shown as lines 62 and 64. The force profile of the lifter 30 with the pattern 36 decreases continuously over the first region from 2.4 cm to 2.9 cm, a region where the force profiles from the other two lifters increased.

Without intending to be bound by any one particular theory, it is believed that the improved force profile of the lifter 30 having the pattern 36 is as follows. The force profile of a lifter is a function of the strength of the biasing force on the lifter, as well as the geometry, thickness, and elasticity of the lifter. The stiffness of the lifter at a given point along its width, which can be proportional to the force applied by the lifter at that point, can be decreased by removing portions of the material that make up the lifter along a given point along its width. As shown in FIG. 2, the prior art lifter 20 has no internal areas where material has been removed to form cut-out regions or slots in the lifter. And as shown in FIG. 5, the force profile of the prior an lifter 20 does not decrease from the innermost track 68 (at 2.3 cm) to about 2.9 cm. However, the lifter 30 having the pattern 36 shown in FIG. 3 has a plurality of slots 39 of material removed from the head 34 of the lifter. The slots 39 gradually increase in length (and thus total area) from the side 46 of the lifter 30 to the middle of its width. And as shown in FIG. 5, the force profile of the lifter 30 having the pattern 36 is much higher at the innermost track 68 (at 2.3 cm) than it is at about 2.9 cm. It should be noted that although the lengths of the slots 39 in the portion of the lifter extending from the middle of the lifter to the side 48 of the lifter gradually decrease from the middle of the lifter to the side 48, the force profile does not increase. This is because the force profile of the lifter 30 having the pattern 36 would decrease in this region even if there were no slots, as indicated by the lines 62 and 64 denoting the force profiles of the prior art lifter 20 and the lifter 30 without the pattern, respectively.

The shape of the lifter 30 having the pattern 36 results in a force profile that decreases smoothly and continuously from the inner to the outer tracks of the disc as shown in FIG. 5. The length, width, location, and orientation of the slots can be varied to obtain the desired force profile.

The lifter 30 having the pattern 36 exerts a greater pressure on the disc at the inner tracks than does the prior art lifter 20, (as shown by the line 66 at the dotted line 68). This extra force does not, however, unduly tax the disc drive which must rotate the disc. This is because the amount of torque necessary to drive the disc is given by the following equation:

$$T = \sum_{i=1}^{n} (\mu_D \cdot F \cdot r)_i$$

where $\mu_D$ is the coefficient of dynamic friction between the disc and the fabric;

F is the force of the fabric on the disc normal to the disc;

r is the length of the lever arm, i.e., the distance from the normal force to the center of rotation; and i is a data track number ranging from 1 for the outermost track to n for the innermost track.

Thus the total torque is equal to the summation of the individual torques for each data track.

The torque for the individual data tracks is a function of the length of the lever arm r for that track. Because the length of the lever arm r is a minimum at the inner tracks, the contribution of those tracks to the overall torque is relatively small. Thus, the increased force applied by the lifter 30 at the inner tracks does not significantly affect the total torque required to rotate the disc, i.e., it does not raise the torque by more than 5%.

A disc may be cleaned by the lifter of the present invention by rotating the disc with respect to the cartridge and its lining. The disc will be cleaned more effectively at its innermost track than at its outermost track because the lifter exerts more force on the disc at the inner tracks. Therefore, it may be possible to decrease the angle α of the bias of the lifter from 6° to 5°, or even 4°, thereby decreasing the force required to rotate the disc, while still achieving acceptable cleaning.

Although the present invention has been described with reference to preferred embodiments, workers skilled in the art will recognize that changes may be made in form and detail without departing from the spirit and scope of the claims. For example, the angle θ between the trailing edge 58 and the leading edge 56 of the head 34 of the lifter 30 can be varied to adjust the force profile of the lifter. Also, the size and shape of the pattern 36 can be varied independently, or in conjunction with, the angle θ to adjust the force profile of the lifter 30.

We claim:

1. A lifter for supporting a fabric liner of a flexible magnetic recording disc so that the disc is cleaned by rotation of the disc with respect to the liner, wherein the lifter includes a foot, to be secured to an inner surface of a cartridge, and a head connected to the foot by an arm, wherein the head has a front end, a rear end, and two opposite, parallel sides, the sides being separated by a distance sufficient to span the distance between the innermost and outermost data tracks on the magnetic recording disc, wherein the head is bounded on its front end by a straight leading edge which is substantially perpendicular to the two parallel sides of the head, wherein the head is bounded on its rear end by the arm and a trailing edge, wherein that portion of the trailing edge that is between the arm and the side of the head intended to be the closer of the two sides to the outermost data tracks on the disc is angled toward trhe leading edge from the arm to said side of the head closer to the outermost data track at an angle within the range from 5° to 40°, whereby, as a result of said angle, a force profile of the lifter taken across its leading edge is smooth, and therefore not characterized by sudden changes in force across the width of the lifter.

2. The lifter of claim 1, wherein said angle within the range from 5° to 40° is within the range of from about 10° to 25°.

3. The lifter of claim 1, further including a pattern within the area of the head and the arm, wherein the pattern includes at least one cut-out region, the region being configured to allow an increase in the force applied by the lifter against the disc along the inner tracks of the disc relative to the outer tracks without raising the overall torque required by a disc drive to drive the disc by more than 5% for a given angle of inclination between the arm and the inner surface of the cartridge.

4. The lifter of claim 3, wherein the pattern is located within the area of the head.

5. The lifter of claim 4, wherein the pattern is generally triangular.

6. The lifter of claim 4, wherein the pattern is formed by removing material from the lifter to form a plurality of parallel, elongated land-bridge strips separated by a plurality of parallel, elongated slots in the lifter.

7. The lifter of claim 6, wherein the elongated strips have a width of about 0.6 mm and the elongated slots have a width of about 1.2 mm.

8. The lifter of claim 6, wherein the elongated strips are substantially parallel to the parallel sides of the head of the lifter.

9. A method of cleaning a flexible magnetic recording disc in a cartridge having a fabric liner in radial contact with a recording region on the disc, including the steps of:

forcing the fabric liner against the disc with a lifter, wherein the lifter supports the fabric liner of the flexible magnetic recording disc so that the disc is cleaned by rotation of the disc with respect to the liner, wherein the lifter includes a foot, to be secured to an inner surface of the cartridge, and a head connected to the foot by an arm, wherein the head has a front end, a rear end, and two opposite, parallel sides, the sides being separated by a distance sufficient to span the distance between the innermost and outermost data tracks on the magnetic recording disc, wherein the head is bounded on its front end by a straight leading edge which is substantially perpendicular to the two parallel sides of the head, wherein the head is bounded on its rear end by the arm and a trailing edge, wherein that portion of the trailing edge that is between the arm and the side of the head intended to be the closer of the two sides to the outermost data tracks on the disc is angled toward the leading edge from the arm to said side of the head closer to the outermost data tracks at an angle within the range from 5° to 40°, whereby, as a result of said angle, a force profile of the lifter taken across its leading edge is smooth, and therefore not characterized by sudden changes in force across the width of the lifter; and rotating the disc with respect to the cartridge and fabric liner, whereby the disc is cleaned.

10. The method of claim 9, wherein said angle within the range from 5° to 40° is within the range of from about 10° to 25°.

11. The method of claim 9, further including a pattern within the area of the head and the arm, wherein the pattern includes at least one cut-out region, the region being configured to allow an increase in the force applied by the lifter against the disc along the inner tracks of the disc relative to the outer tracks without raising the overall torque required by a disc drive to drive the disc by more than 5% for a given angle of inclination between the arm and the inner surface of the cartridge.

12. The method of claim 11, wherein the pattern is located within the area of the head.

13. The method of claim 12, wherein the pattern is generally triangular.

14. The method of claim 12, wherein the pattern is formed by removing material from the lifter to form a plurality of parallel, elongated land-bridge strips separated by a plurality of parallel, elongated slots in the lifter.

15. The method of claim 14, wherein the elongated strips have a width of about 0.6 mm and the elongated slots have a width of about 1.2 mm.

16. The method of claim 14, wherein the elongated strips are substantially parallel to the parallel sides of the head of the lifter.

* * * * *